Figure 1:
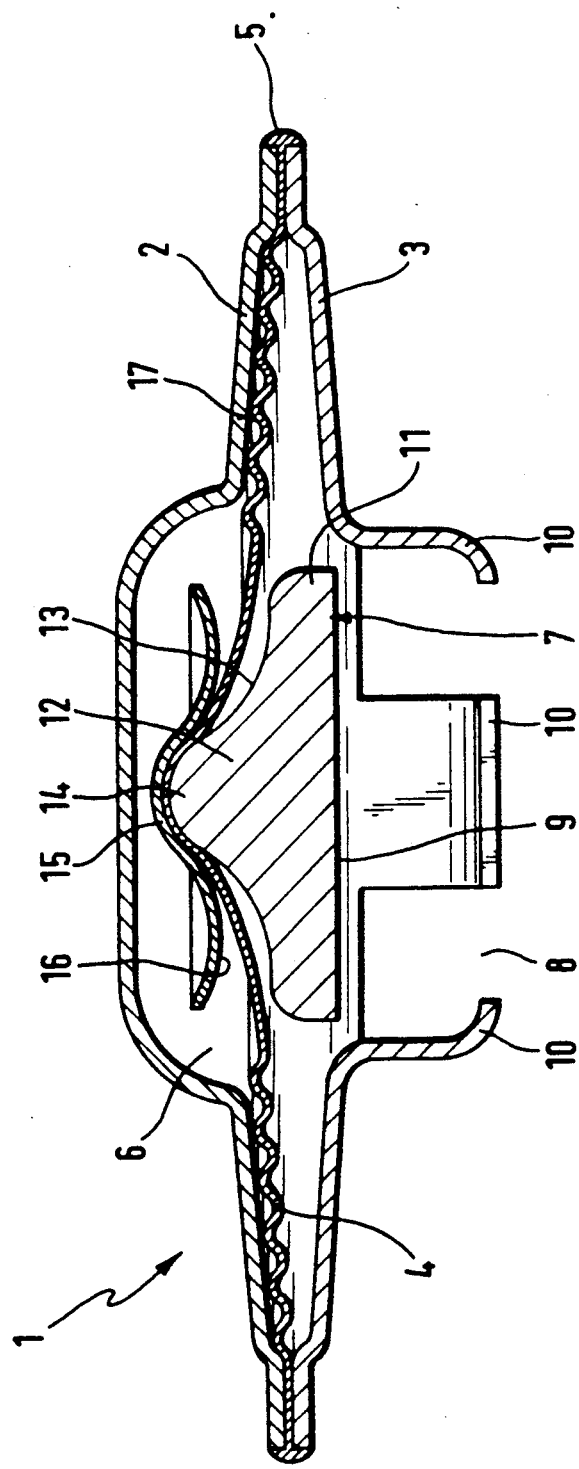

United States Patent [19]
Ayvaz

[11] Patent Number: 5,082,237
[45] Date of Patent: Jan. 21, 1992

[54] STEAM TRAP
[75] Inventor: Ohannes Ayvaz, Istanbul, Turkey
[73] Assignee: Haci Ayvaz, A.S., Istanbul, Turkey
[21] Appl. No.: 624,237
[22] Filed: Dec. 7, 1990
[30] Foreign Application Priority Data
  Dec. 7, 1989 [DE] Fed. Rep. of Germany ....... 3940775
[51] Int. Cl.⁵ ......................................... F16K 31/126
[52] U.S. Cl. ..................................... 251/11; 251/61.1
[58] Field of Search ................................ 251/11, 61.1
[56] References Cited U.S. PATENT DOCUMENTS
669,669 3/1901 Squires ........................... 251/61.2 X FOREIGN PATENT DOCUMENTS
425740 2/1926 Fed. Rep. of Germany.
3031134 11/1981 Fed. Rep. of Germany ..... 251/61.2

Primary Examiner—John C. Fox
Attorney, Agent, or Firm—Jones, Askew & Lunsford

[57] ABSTRACT

The invention relates to a thermally controlled steam trap with a casing formed from two disk-like wall portions, with a diaphragm arranged between them and which is tightly welded at its outer edge to the two wall portions and forming with one wall portion a chamber receiving an expansion medium, and with a closure centrally fixed to the diaphragm and cooperating through a bore in the second wall portion with a valve seat. According to the invention the closure 7 is centrally connected to the diaphragm 4 and a counterpart 15 by resistance force welding. In order to obtain a clean weld, the closure 7 is specially designed for resistance forge welding.

10 Claims, 2 Drawing Sheets

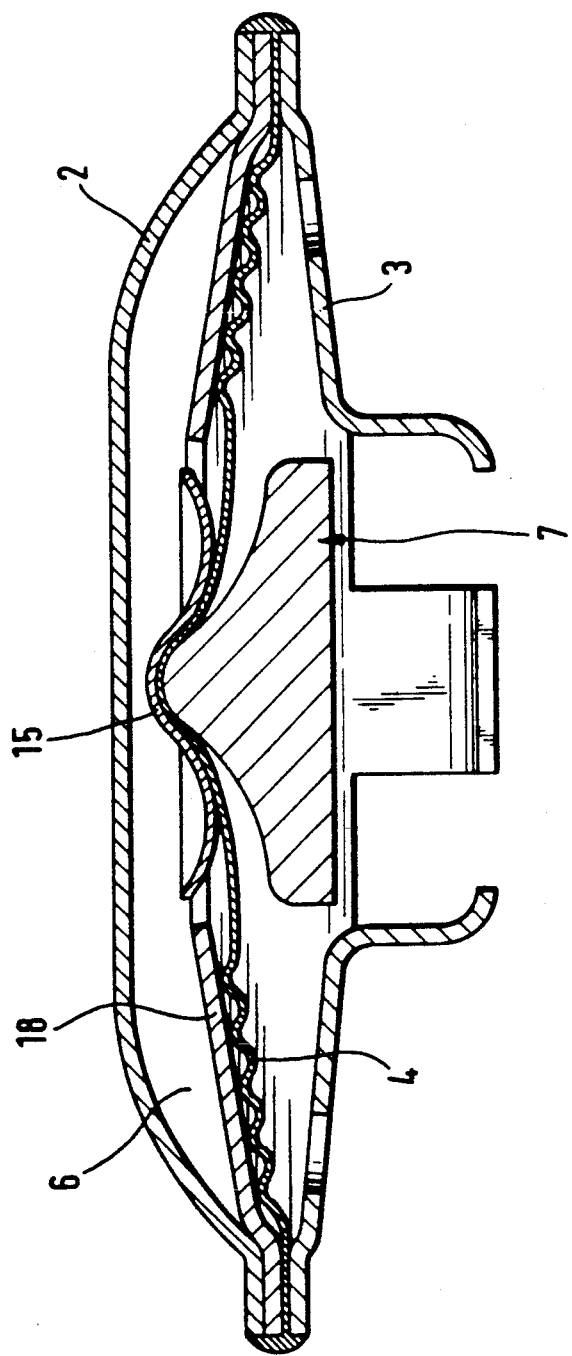

STEAM TRAP

The invention relates to a steam trap of the type specified in the preamble of the main claim.

Such a steam trap is e.g. known from German Patent 19 17 585. The steam trap described therein essentially comprises a chamber closed by a diaphragm and which is filled with a medium expanding when heat is supplied and contracting when heat is removed and which when the temperature changes brings about a lifting movement of the diaphragm. A closure, which cooperates with a valve seat, is centrally arranged on the diaphragm.

It has always been a problem to so connect the closure to the diaphragm, optionally with the aid of a counterpart, in such a way that a permanent tight connection is ensured and that the diaphragm is not so damaged that its life is drastically reduced.

In a steam trap known from German Patent 19 17 585, the closure is e.g. connected by a rivet to the diaphragm and a counterpart. The connection procedure by rivets is disadvantageous in that leaks are to be featured. A leak leads to a running out of the expansion medium and consequently the steam trap becomes unusable.

Steam traps are known, e.g. from French patent 858 960, in which the central rivet is additionally circumferentially welded to the diaphragm or in the case of a multilamellar diaphragm to the individual lamellas of the diaphragm. The combination of rivets and welding is very complicated from the production standpoint.

German patent 26 30 038 discloses a steam trap of the aforementioned type with a diaphragm comprising several lamellas, in which the closure is centrally provided on the diaphragm side with a torus and has a clamping disk (a counterpart). The clamping disk and the diaphragm lamellas have a central bore and in the end face region thereof adjacent to the central bore have a complementary shape to the external circumferential surface of the torus. The diaphragm lamellas are fixed between the closure and the clamping disk (the counterpart) and the closure, the clamping disk and the diaphragm lamellas are firmly and tightly welded together on their adjacent bore edges or on the back of the torus. However, this connection method is also relatively complicated from the production standpoint, because several bores have to be made either by machining, or by punching.

A basically similar fastening mode is known from German Patent 31 24 459 in which the bore has an undercut in the closure, so that there is no need to deform the diaphragm in the vicinity of the welding zone.

It is common to all the known stream traps that the connection between the closure and the diaphragm optionally formed from several lamellas is very complicated from the production standpoint.

The problem of the invention is consequently to so improve a steam trap of the aforementioned type, that it is possible to easily and reliably connect the diaphragm and the closure, as well as a counterpart.

In the case of the aforementioned steam trap, this problem is inventively solved by the feature of the characterizing part of claim 1.

As a result of the inventive construction of the closure, the diaphragm and the counterpart, contact surfaces are created in an extremely simple manner which are eminently suitable for a connection by resistance forge welding.

For the preferred embodiments of the invention are described in the sublcaims. In particular according to the subclaim 4 the ring area of the counterpart and the approximately conical portion of the closure secure the diaphragm between them, so that the bending stresses caused by diaphragm lift are kept away from the welding zone, which has undergone a structural change.

According to further preferred embodiment it is also possible to provide a disk-like component serving as a diaphragm lift limiter or stop.

The invention is described in greater detail hereinafter relative to the drawings, wherein show:

FIG. 1 an embodiment of an inventive steam trap.

FIG. 2 a steam trap according to the invention with an additional lift limiting disk.

An inventive steam trap 1, as shown in FIG. 1, comprises two disk-like wall portions 2,3, between which is secured a diaphragm 4. The wall portions 2,3 and the diaphragm 4 are welded together along their circular circumference 5. A chamber 6, which is filled with an expansion medium, is formed between the diaphragm 4 and the upper wall portion 2. A closure 7 is centrally fixed to the diaphragm and cooperates by an opening 8 in the lower wall portion 3 with a not shown valve eat.

If the steam trap is wetted with condensed steam, which is cooler than the supersaturated steam which normally travels past the steam trap, then the expansion medium in the chamber 6 contracts, so that the diaphragm 4 and with it the closure 7 is moved into the represented position. A lower bearing surface 9 of the closure 7 is then raised from the not shown valve seat and then the condensed steam can flow out. If the temperature of the medium flowing past the steam trap rises again, i.e. when all the condensed steam has been let off and the steam trap is only surrounded by superheated steam, then the expansion medium in the chamber 6 expands again, so that the diaphragm 4 and with it the closure 7 is moved downwards, so that the bearing surface 9 of the closure 7 comes to rest on the valve seat.

The entire steam trap 1 can be fixed with retaining springs 10 engaging in finger-like manner about a not shown edge of the valve seat.

According to the invention the geometrical basic shape of the closure 7 comprises three partial bodies. To the bearing surface 9 is initially connected a cylindrical partial body 11, which passes into an upwardly tapering, roughly conical rotating body 12, whose envelope curve 13 can be concave and finally this is followed by a spherical portion 14. In an area adjacent to the closure, the diaphragm 4 is shaped in a complimentary manner to the said spherical cup or to said spherical portion. In the vicinity of the spherical portion 14, the closure 7 is connected to the diaphragm 4 and a counterpart 15 located on the other side of the diaphragm by resistance forge welding. The counterpart 15 has an all-round, annular contact surface 16, which can optionally be drawn down to such an extent that the diaphragm 4 is fixed between said annular contact surface 16 and the circumferential surface of the conically constructed rotating body. Thus, bending stresses can be kept away from the welding zone in which a structural change has taken place. This considerably increases the life of the diaphragm 4.

As is know per se, the diaphragm 4 can be optionally formed from several individual lamellas, which are welded together.

FIG. 2 shows an embodiment of the inventive steam trap, which the chamber 6 is made larger by a modified design of the upper disk-like wall portion 2 than in the embodiment of FIG. 1.

In the embodiment according to FIG. 1 the lift of the upwardly moving diaphragm is limited by all-round contact surfaces 17 of the upper wall portion 2. In the embodiment according to FIG. 2 an additional disk 18 is provided, which functions as a lift limiter and prevents damage to the diaphragm 4 as a result of an excessive lift.

As a result of the inventive construction of a steam trap with a closure specially designed for this purpose and connected to the diaphragm by resistance forge welding, the manufacturing costs for such a steam trap are reduced, without any decrease in the reliability and life thereof.

I claim:

1. Steam trap comprising:
   a casing formed from two disk-like wall portions;
   a diaphragm positioned between the two wall portions, the diaphragm having an outer edge welded to the two wall portions and forming, with one of the wall portions, a chamber for receiving an expansion medium, the diaphragm also having a central depression;
   a closure having a cylindrical partial body cooperating with a valve seat through an opening in another of the wall portions, a tapering, conical rotating body extending from the cylindrical partial body, and a spherical portion extending from the conical rotating body, the central depression of the diaphragm receiving the spherical portion of the closure; and
   a counterpart disposed in the chamber and having a depression receiving the depression of the diaphragm so that the diaphragm is positioned between the counterpart and the spherical portion of the closure,
   the closure, the diaphragm and the counterpart being interconnected.

2. Steam trap as in claim 1 wherein the diaphragm comprises several lamellas.

3. Steam trap as in claim 1 further comprising a third disk-like component between the two wall portions for limiting lifting movement of the diaphragm.

4. Steam trap as in claim 3 wherein the diaphragm includes several lamellas.

5. Steam trap as in claim 1 wherein the closure, the diaphragm and the counterpart are connected by resistance forge welding.

6. Steam trap as in claim 5 wherein the diaphragm comprises several lamellas.

7. Steam trap as in claim 5 further comprising a third disk-like component between the two wall portions for limiting lifting movement of the diaphragm.

8. Steam trap as in claim 7 wherein the diaphragm comprises several lamellas.

9. Steam trap as in claims 1, 2, 3, 4, 5, 6, 7 or 8 wherein the counterpart has an all-round, annular contact surface for the diaphragm.

10. Steam trap as in claim 9 wherein the diaphragm is fixed between the annular contact surface of the counterpart and the conical rotating body of the closure.

* * * * *